United States Patent [19]

Georges et al.

[11] Patent Number: 4,642,938
[45] Date of Patent: Feb. 17, 1987

[54] PLANT PROTECTION SYSTEM

[76] Inventors: Richard P. Georges, 749 Avenue M, SE., Winter Haven, Fla. 33880; George B. Epperson, P.O. Box 231, San Antonio, Fla. 33576

[21] Appl. No.: 765,448

[22] Filed: Aug. 14, 1985

[51] Int. Cl.$^4$ .......................................... A01G 13/00
[52] U.S. Cl. .............................................. 47/2; 47/23; 47/25
[58] Field of Search ............. 47/2, 22, 23, 24, 25, 47/27, 66

[56] References Cited

U.S. PATENT DOCUMENTS

| | | | |
|---|---|---|---|
| 219,987 | 9/1879 | Scott | 47/23 |
| 2,006,562 | 7/1935 | Scheu | 47/2 |
| 3,755,961 | 9/1973 | McIsaac | 47/2 |
| 3,841,558 | 10/1974 | Fowler et al. | 47/2 |
| 3,890,740 | 6/1975 | Miller | 47/2 |
| 4,222,196 | 9/1980 | Pointon | 47/27 |
| 4,348,831 | 9/1982 | Chambers | 47/27 |

FOREIGN PATENT DOCUMENTS

| | | | |
|---|---|---|---|
| 801796 | 1/1951 | Fed. Rep. of Germany | 47/66 |
| 2356361 | 3/1978 | France | 47/23 |
| 623721 | 6/1981 | Switzerland | 47/25 |

Primary Examiner—Robert A. Hafer
Assistant Examiner—Bradley M. Lewis
Attorney, Agent, or Firm—Nies, Webner, Kurz & Bergert

[57] ABSTRACT

A plant protection system which utilizes a housing and a heat source is disclosed. In one embodiment, the invention includes a truncated cone shaped housing which is positioned on the ground so as to surround the tree or other plant. The heat source may, for example, include a water pipe and spray emitter located within the housing to provide water in spray form near ground level adjacent the tree. A deep well may be used as the water source, thus providing water at a temperature higher than the ambient temperature. As the warm water spray rises within the housing, heat is transferred to the interior of the housing. An extension having side walls in the form of an inverted cone may be secured to the upper end of the housing to provide a further heating effect. Any of various designs and constructions for the housing and the extension may be employed. The heating means may also be provided from any of various sources and materials.

14 Claims, 6 Drawing Figures

FIG. 5
FIG. 6
FIG. 4
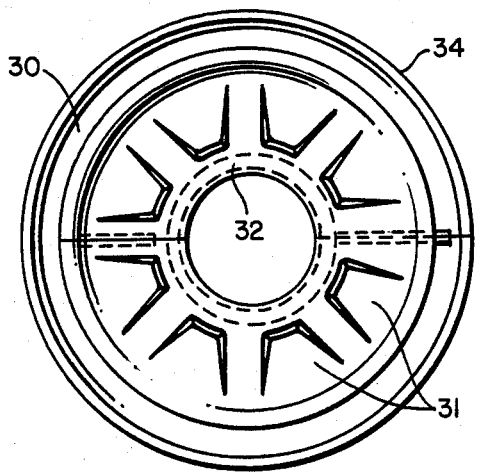
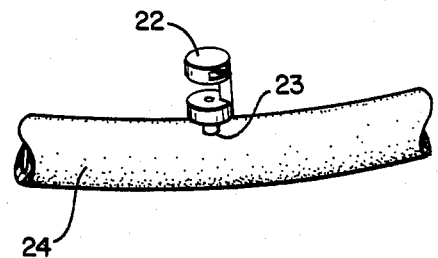
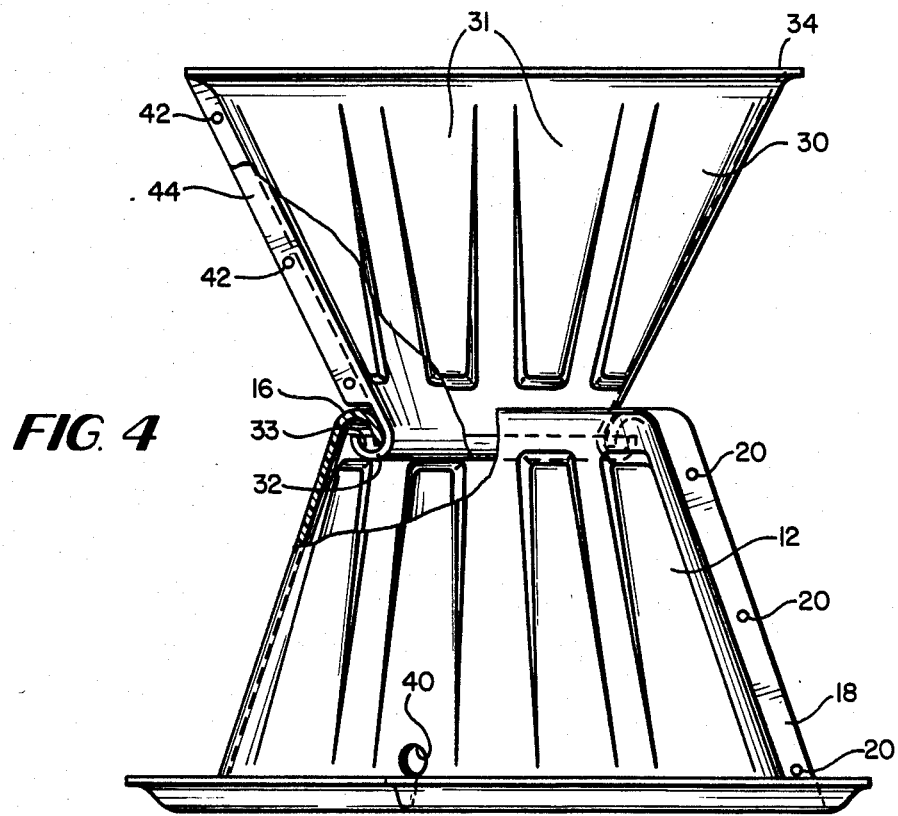

PLANT PROTECTION SYSTEM

BACKGROUND AND SUMMARY OF THE INVENTION

The present invention relates to a plant protection system for use in providing environmental protection. More particularly, the present invention relates to a protection system for plants which utilizes a housing and an individual source of heat within the housing to protect against environmental extremes such as cold weather by shielding against the elements thereby providing maximum benefits from cultural practices.

In the growing of plants such as young citrus trees and other plants, there has been a need for protection of such plants against the extremes of weather, particularly freezing temperatures and high wind conditions. In the case of young citrus trees, for example, a condition known as the "super cooling effect", whereby high velocity winds at low temperatures and a low dew point cause moisture to evaporate at a very high rate, has been a serious threat and there has not previously been available an effective means of protecting young citrus trees from extensive damage and loss of trees due to such conditions.

By the present invention, there is provided a system which results in environmental regulating of the immediate surrounding area of a plant or multiple plants with individual housings which enable the use of outside sources of energy to provide plant protection as required. The present system also provides a protected control area for chemical application and shields the plant from outside sources of damage. The invention includes a housing which may be removable seasonally or left in place so long as it is of service to the plant. Various housing designs and constructions which utilize the principles of the basic concept as stated herein are within the scope of the present invention.

In one embodiment of the present invention, the housing is in the form of a truncated cone. Such a configuration is representative of a style of housing with specific characteristics which fulfill the requirements of the basic principles of the invention. However, it is intended that other forms of housing may be employed, of any design or shape which gives the specified results. Thus the housing may be a unit of any design which houses one or more plants and modifies the environmental conditions surrounding the plant so as to aid growth and husbandry practices while protecting vital parts of the plant from environmental and foreign damage by:

(1) enabling the application of heat to protect the plant from damaging cold;
(2) preventing chill factors from creating super cold temperatures in the control area;
(3) retaining maximum heat from applied energy;
(4) shielding against damaging outside forces;
(5) creating no adverse conditions for plant growth;
(6) providing permanent and seasonal protection;
(7) providing a protected control area for application of agricultural chemicals; and
(8) creating a shielded central area for the plant or plants enclosed by the housing.

The present invention provides a system for protecting plants such as citrus trees as well as other types of trees and plants. In one embodiment, the present invention utilizes a housing or covering for the plant along with a source of water, with the water being emitted inside the housing in the form of an atomized spray so as to provide a controlled environment within the housing. The invention may be employed in a citrus grove of young trees, with a separate housing for each tree and with an irrigation system being employed to provide a source of water to the interior of each housing. The irrigation system may be tied in with a deep well which provides water at relatively constant year round temperatures such as about 70 to 72 degrees F. By emitting the water in the form of spray within the interior of the housing at ground level, and with the housing in one embodiment being of a generally conical shape with an open top, the warm water in spray form is caused to rise along the interior side walls of the cone shaped housing and to curl downwardly from the top of the housing in which a downwardly concave lip is provided, with the result that the heat from the relatively warm well water is transferred to the interior of the housing, thus creating conditions of 50 to 60 degrees F. temperatures within the interior or the housing while the ambient air temperature outside the housing may be approximately 16 to 20 degrees F. Such ambient temperatures would result in devastating damage if citrus trees were directly exposed to such conditions for any considerable time.

BRIEF DESCRIPTION OF THE DRAWINGS

FIG. 4 is a front elevation of an alternative embodiment of the plant protection system of the present invention.

FIG. 5 is a top plan view of the embodiment of FIG. 4.

FIG. 6 is a perspective view of a hose and emitter system employed with the plant protection system of the present invention.

DESCRIPTION OF THE PREFERRED EMBODIMENTS

Figure 1:
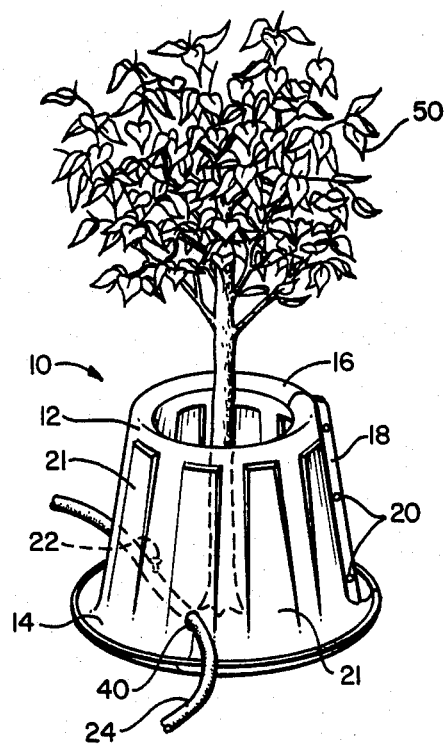
FIG. 1 is a perspective view of a plant protection system constructed in accordance with the present invention.
Figure 2:
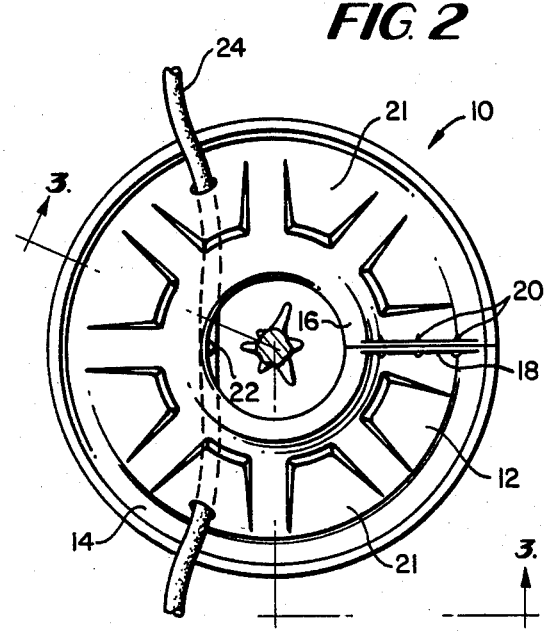
FIG. 2 is a top plan view of the plant protection system of FIG. 1.
Figure 3:
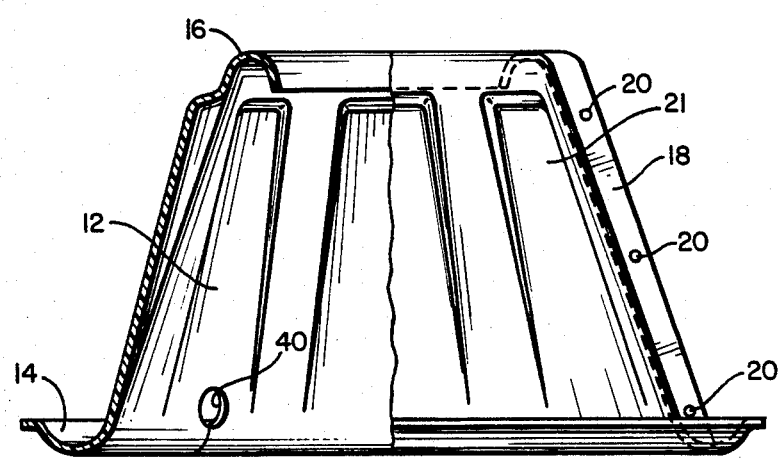
FIG. 3 is front elevation of the plant protection system taken along line 3—3 of FIG. 2.

In the embodiment of the present invention as shown in FIGS. 1 through 3, there is provided a plant protection system 10 which includes a generally truncated cone shaped housing 12 having horizontally extending, generally planar base portion 14 and upper truncated end portion 16 having a downwardly concave lip configuration. The housing 12 may be constructed of a material such as high density polyethylene, of 60 mil. thickness, having a vertical seam at 18 with suitable releasable fasteners 20 which allow the seam 18 to be closed so as to provide an essentially monolithic or one-piece wall structure for the housing 12. In forming the housing 12, a series of vertically extending, generally rectangular shaped ridges or protrusions 21 may be formed into the side walls of the housing 12 to provide rigidity and sturdiness of construction. It is also within the scope of the invention for the housing to have any of various other shapes, such as box-shaped with an open upper end, for example, or other shapes such as a spherical housing with an opening in the upper end.

The base portion 14 extends generally horizontally outwardly from the lower end of the side walls of the housing 12. An upwardly concave curvature may be provided to the base 14, to assist in making the structure more rigid and also to hold dirt or other material as a means of maintaining the housing 12 in a stationary position during high wind conditions.

The present invention provides an environmental control which utilizes the heat from well water. It would of course be within the scope of the invention to use water from another source such as a lake or stream or to use other sources of heat. The water spray within the housing 12 is obtained by the use of a suitable spray emitter 22 which is connected directly to a hose or pipe 24 which conducts the water through the housing 12 from a source such as an irrigation system. Thus, for example, a shrub-head sprayer nozzle or a jet spray nozzle or a fog head may be employed, utilizing a spray pattern such as 180 degrees or a pattern of 300 to 360 degrees. Preferably the spray pattern should be such as to avoid the tree trunk. It is within the scope of the invention for a plurality of emitters to be employed.

In one embodiment of the invention, a cone shaped housing 12 was employed having an interior diameter at the base 14 of about 23 inches and an interior diameter at the truncated upper end 16 of about 8 inches, and with a vertical height for the housing of about 14 inches. By the use of a suitable pump, the water can be supplied at a rate of from about 5 to about 30 gallons per hour within the housing 12, at a pressure of approximately 10 to 25 psi, conditions such as are employed in low volume spray irrigation.

In a further embodiment of the invention as shown in FIGS. 4 and 5, an extension is employed in the form of an inverted truncated cone shaped member 30 positioned upon the base housing 12. Any of various shapes may be employed for the extension, as long as the desired effect is achieved. Ridge portions 31 are provided for extension 30, similar to those provided in housing 12. The inverted extension 30, of a material similar to that of housing 12, flares outwardly and upwardly so that any heat which passes upwardly through the open end 16 of the main housing 12 may be further utilized to heat the upper portion of a young tree or other plant. In a specific example of this embodiment, the extension 30 has an interior diameter at its base 32 of about 8 inches, an interior diameter at the upper end 34 of about 21 inches and a vertical height of about 12 inches. The inverted cone shaped extension 30 may be advantageously employed either permanently or as needed, for example, during the winter with the extension 30 being installed for three or four months during the coldest winter months and then removed.

The cone shaped structure of the housing 12 makes it ideally suited for stacking in groups in the citrus grove or other area in which the system is to be employed. In order to install the housing 12, the fasteners 20 at the vertical seam 18 are unfastened as necessary so that the housing 12 can be opened sufficiently to fit around the small tree 50 or other plant to be protected. The hose or pipe 24 for carrying the water is passed through openings 40 in opposite sides of the lower wall of the housing 12 and a suitable emitter 22 installed in the hose 24 as shown in the drawings. Such installation may, for example, be accomplished by use of an emitter having a threaded lower end 23 which is screwed into the tubing or pipe. The emitter 22 will be located slightly off center within the housing 12 since the tree itself will generally be located directly in the center of the housing 12. The hose or pipe 24, which is at ground level within the housing 12, may then be connected to a suitable source of water. In some instances it may be desirable, such as in a citrus grove, to utilize a network of pipes or hoses with some of the pipes or hoses being located underground and with risers being employed to position the spray emitter 22 for each tree at ground level. In order to obtain the desired warming effect, the water must be atomized into the air, although the hose can be below ground. In one embodiment, a pipe 24 in the form of polyethylene tubing having an I.D. in the range of ¾ inch to 1 inch was employed.

The extension 30 may be installed by pressing inwardly on the pliable base portion 32 of the extension 30 sufficiently to allow the base 32, having an upwardly concave curved lip 33 around the periphery of the base 32, to fit within the downwardly curved lip extending around the upper end 16 of housing 12. Alternatively, the fasteners 42 in vertical seam 44 of the extension 30 may be loosened to allow the walls of the extension 30 to overlap sufficiently to install the extension within the upper end 16 of the housing 12. The fasteners 42 will generally be initially loosened in any event to allow the extension 30 to be fitted around the tree. The close fit of the extension 30 within the upper end 16 of the housing 12, together with the outwardly flared configuration of the extension 30, results in the extension 30 securely maintaining its position at the upper end of the housing 12.

The cone shaped housing 12 provides a wide area at the bottom to disperse the heat from the warm water being atomized. The heat is concentrated as the warm fog or water vapor rises up the sides of the tapered cone 12 to the smaller diameter upper portion. The upper lip 16 then directs the heated water vapor back downwardly so as to provide an additional warming effect within the housing 12. The use of the extension 30 results in the upwardly moving warm air and fog or water vapor being further directed closely around the tree so as to provide an additional warming effect.

It is within the scope of the present invention to employ alternative heating means within the housing 12. Thus, for example, a source of fuel in liquid form, such as fuel oil, could be passed into the interior of the housing through suitable fuel lines and burned to provide heat. Fuel in solid form such as sterno or firewood, for example, could also be employed. In addition, any of various exothermic chemicals could be employed, for example, with water being added to generate heat.

The plant protection system of the present invention provides the following advantages and features: retains maximum heat from applied water; maintains optimum jet position; shields against wind and associated problems; protects trunk and buds from animal damage; insures maximum benefits from applied water; permits use of approved herbicides and acts as a herbicide diffuser; reduces trunk sprouting and weed growth; increases growth rate with ideal conditions; prevents trunk damage due to sweating; and eliminates trunk damage from super cooling.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. Apparatus for protecting a tree or other plant against extreme weather conditions without ice formation through a water irrigation system having at least one conduit for supplying water to each said plant from a water pressure control means coupled to a supply of water at a temperature higher than ambient, comprising: a housing for positioning around said plant, said housing including a continuous side wall portion having upper and lower ends with an opening in the upper end of a size sufficient to allow said plant to pass through, and with an inwardly extending lip configuration around the periphery of said upper end, a portion of said conduit being received through said side wall portion of said housing so that said conduit portion is positioned in a generally central location within the lower end of the interior of said housing; and water spray emitter means attached to said conduit portion positioned in said housing in fluid communication with the interior of said conduit.

2. The apparatus of claim 1 wherein said housing is in the form of a truncated cone with openings in the upper and lower ends.

3. The apparatus of claim 1 wherein said housing has a plurality of vertically extending, generally rectangular shaped ridges in the side wall portion thereof.

4. The apparatus of claim 1 wherein said housing includes a generally horizontal planar base extending around the periphery of the lower end of said side wall portion, said base having an upwardly concave curvature.

5. The apparatus of claim 1 wherein a vertical seam is provided in said side wall portion, said seam providing a closeable opening along the length of said seam, with at least one releasable fastener for closing the opening provided by said seam.

6. The apparatus of claim 1 further including an extension mounted on said housing and extending upwardly from the upper portion of said housing, said extension having an opening in the upper end thereof.

7. The apparatus of claim 6 wherein said extension is in the form of an inverted truncated cone mounted on the upper end of said housing.

8. A method of protecting a tree or other plant against extreme weather conditions through a water irrigation system having at least one conduit for supplying water to each said plant from a water pressure control means coupled to a supply of water at a temperature higher than ambient, said method comprising:

(a) positioning a housing around said plant, said housing including a continuous side wall portion having upper and lower ends with an opening in the upper end of a size sufficient to allow said plant to pass through, and with an inwardly extending lip configuration around the periphery of said upper end;

(b) passing said conduit through the lower end of said side wall portion of the housing so that a portion of said conduit is positioned in a generally central location within the lower end of the interior of said housing;

(c) positioning water spray emitter means on the conduit portion within said housing so that said spray emitter means is in fluid communication with the interior of said conduit; and (d) passing water from said water supply through said conduit and said spray emitter means at sufficient water pressure to provide water in atomized spray form to the interior of said housing, the water in spray form at a temperature higher than ambient being caused to rise along the interior of the side walls of said housing without formation of ice, thus transferring heat to the interior of said housing.

9. The method of claim 8 wherein said housing is in the form of a truncated cone.

10. The method of claim 8 wherein a vertical seam is provided in the side wall portion of said housing, and wherein step (a) includes opening said seam sufficiently to fit the housing around the plant.

11. The method of claim 10 wherein at least one releasable fastener is provided for closing the opening in the housing provided by said seam, and including the step of closing said opening by the use of said fastener after the housing is positioned around said plant.

12. The method of claim 8 including the further step of positioning an extension on the upper end of said housing, said extension having an opening in the upper end thereof.

13. The method of claim 12 wherein said extension is in the form of an inverted truncated cone.

14. The method of claim 12 wherein the upper end of said housing has an inwardly extending, downwardly concave lip configuration and the lower end of said extension has an outwardly extending, upwardly concave curved lip around the periphery thereof.

* * * * *